United States Patent
Dilling et al.

(10) Patent No.: US 6,782,821 B2
(45) Date of Patent: Aug. 31, 2004

(54) OFFSET PRINTING MACHINE HAVING INTERMEDIATE SLEEVE FITTED TO CORE CYLINDER USING COMPRESSED AIR

(75) Inventors: Peer Dilling, Friedberg (DE); Horst Dauer, Rohrbach (DE); Martin Weinberger, Augsburg (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 171 days.

(21) Appl. No.: 09/860,167

(22) Filed: May 17, 2001

(65) Prior Publication Data

US 2002/0002920 A1 Jan. 10, 2002

(30) Foreign Application Priority Data

May 17, 2000 (DE) .......................................... 101 24 001

(51) Int. Cl.[7] .................................................. B41F 13/10
(52) U.S. Cl. ........................................ 101/375; 101/376
(58) Field of Search ............................... 101/375, 376, 101/389.1, 217, 216, 368

(56) References Cited

U.S. PATENT DOCUMENTS

| | | | |
|---|---|---|---|
| 4,378,622 A | 4/1983 | Pinkston et al. | ............ 29/148.4 |
| 4,461,663 A | 7/1984 | Tachibana et al. | ............ 156/86 |
| 4,685,393 A | 8/1987 | Saueressig | .................. 101/375 |
| 4,917,013 A | 4/1990 | Katz | .......................... 101/375 |
| 5,706,731 A | 1/1998 | Francille et al. | ............ 101/375 |
| 5,797,322 A | * 8/1998 | Lorig et al. | .................. 101/375 |
| 5,819,657 A | 10/1998 | Rossini | ....................... 101/376 |
| 5,983,799 A | * 11/1999 | Lane et al. | .................. 101/375 |
| 6,085,653 A | * 7/2000 | Goovaard et al. | .......... 101/376 |
| 6,360,662 B1 | * 3/2002 | Busshoff | ...................... 101/375 |
| 6,374,734 B1 | * 4/2002 | Gaffney et al. | ............. 101/376 |

FOREIGN PATENT DOCUMENTS

| | | |
|---|---|---|
| DE | 195 45 597 | 6/1997 |
| DE | 695 05 044 | 5/1999 |
| DE | 197 53 744 | 6/1999 |
| EP | 0 053 791 | 12/1984 |
| EP | 0 711 655 A2 | 5/1996 |
| WO | 98/29259 | 7/1998 |

OTHER PUBLICATIONS

Patent Abstracts of Japan; JP 0005024174 AA.

* cited by examiner

Primary Examiner—Anthony H. Nguyen
(74) Attorney, Agent, or Firm—Cohen, Pontani, Lieberman & Pavane

(57) ABSTRACT

Variable-format web-fed offset printing machine having printing-unit cylinders comprising core cylinders to which compressed air can be applied and onto which intermediate sleeves can be pushed axially and shrunk on radially. Each intermediate sleeve includes a carrier layer whose inner face rests on the core cylinder, a compressible intermediate layer, a transition layer, and a variable-thickness bridging layer, which ends with a covering layer to which a further surface like a printing plate or a rubber blanket can be fitted.

7 Claims, 3 Drawing Sheets

OFFSET PRINTING MACHINE HAVING INTERMEDIATE SLEEVE FITTED TO CORE CYLINDER USING COMPRESSED AIR

BACKGROUND OF THE INVENTION

1. Field of the Invention

The invention relates to variable-format web-fed offset printing machines and a method of producing variable-format surfaces.

2. Description of the Related Art

U.S. Pat. No. 5,819,657 discloses the production of plastic sleeves with various wall thicknesses, which are fitted to core cylinders as intermediate sleeves and bear flexographic or gravure printing plates with different circumferential lengths. The intermediate sleeves are constructed from an inner layer which, under air pressure, expands in the radial direction and compresses a following compressible layer. The compressible layer is followed by a solid transition layer which bears an incompressible bridge layer of different thickness—depending on the format. A printing sleeve with a printing plate may be fitted to a cylindrical terminating layer over the bridge layer.

The intermediate sleeves can be pushed onto a core cylinder by means of compressed air, and the printing sleeves can be pushed onto the intermediate sleeves— likewise over an air pad produced with compressed air. For mounting the intermediate sleeves, a compressed-air connection is provided at the end of the core cylinder, and holes in its circumferential surface. On the intermediate sleeves, air channels are provided in the bridge layer, parallel to the axis of rotation of the cylinder, and have pressure connections at the end annular surface and lead to the circumferential surface of the terminating layer via radial holes which are spaced apart axially from one another.

In order to shrink the intermediate sleeves and the printing sleeves on axially, and to remove them, it is disadvantageous to have to provide two separate air supplies on the printing machine. The air channels running axially in the bridge layer are complicated to produce and require a minimum wall thickness of the bridge layer.

U.S. Pat. No. 5,706,731 discloses flexography cylinders with hollow supporting cylinders, which are provided with a central air supply and, in the vicinity of the insertion end, have radial holes on the circumference as connecting channels to the centre, to which compressed air can be applied. Intermediate sleeves are pushed onto these supporting cylinders and, at their one end, likewise have radial holes, in order to be able to use the centrally supplied compressed air to mount printing plates onto the circumferential surface as well. In order that the operation of shrinking the intermediate sleeves on axially is not disrupted as soon as their air channels come into alignment with the air supplies of the supporting cylinders, the intermediate sleeves are provided with rotatable closure rings. By means of the latter, the air outlet at the circumferential surface can be closed and, as soon as the intermediate sleeve has been shrunk on completely, the path for the compressed air to the circumferential surface of the intermediate rings can be opened by rotating the closure rings, by which means a printing plate can be shrunk onto the intermediate sleeve.

The switchable closure rings have to be produced precisely and make the intermediate sleeves more expensive.

SUMMARY OF THE INVENTION

The object of the invention is to make economic, variable-format printing with web-fed offset printing machine possible by means of simply constructed and simply mounted sleeves on the printing-unit cylinders.

According to a first aspect of the invention, each printing unit cylinder includes (a) a core cylinder having an outer circumferential surface and means for supplying compressed air to the surface;

(b) a carrier layer having an inner surface which rests on the surface of the core cylinder;

(c) a compressible intermediate layer over the carrier layer;

(d) a transition layer over the compressible intermediate layer;

(e) a variable thickness bridging layer over the transition layer; and (f) a covering layer on the variable thickness bridging layer, which covering layer is suitable for receiving a functional surface, such as a printing plate or a rubber blanket, which can be pushed on axially and shrunk on radially.

According to a second aspect of the invention, each printing unit cylinder includes the elements (a) to (e) above, however the covering layer is deleted and the bridging layer is suitable for receiving a functional layer which can be inseparably fitted to the bridging layer.

According to a third aspect of the invention, a variable format cylinder for a web-fed offset printing machine is produced by the following steps (a) providing an intermediate sleeve having an open interior with axial end openings, an outer circumferential surface, and holes extending between the open interior and the outer circumferential surface;

(b) closing the open ends in an air-tight manner;

(c) supplying compressed air to the interior so that air emerges from the holes on the outer circumferential surface of the intermediate sleeve to form an air pad;

(d) pushing a functional sleeve axially onto the outer circumferential surface of the intermediate sleeve while the said compressed air is being supplied;

(e) switching off the compressed air so that the functional sleeve shrinks radially onto the intermediate sleeve;

(f) providing a core cylinder having an outer circumferential surface and means for supplying compressed air to the outer circumferential surface of the core cylinder;

(g) supplying compressed air to the outer circumferential surface of the core cylinder;

(h) pushing the intermediate sleeve with the functional sleeve onto the outer circumferential surface of the core cylinder while the compressed air is being supplied; and (i) switching off the compressed air so that said intermediate sleeve shrinks radially onto the core cylinder.

The invention makes a format change possible which can be carried out quickly and simply by the printer himself.

By means of the invention, the investment costs involved in procurement are advantageously reduced, since the plastic sleeves for different formats can be bought in at any time.

It is also particularly advantageous that the users of conventional and digital web-fed offset printing can print with variable cut lengths in accordance with their specific requirements, and are therefore able to run economic production, matched to the job, with the respective optimum paper waste.

As a result of the advantageous configuration according to the invention, the intermediate sleeves have a low weight, as a result of which they can be replaced easily and ergonomically.

As a result of the beneficial choice of materials with a low thermal conductivity and heat capacity, the sleeves according to the invention are advantageously also suitable for computer-to-press technologies, in which the printing plates have images set on them within the printing machine and lead to heating of the surfaces, such as in the case of the thermal transfer processes.

The particularly advantageous shaping of the intermediate sleeve, which forms a detachable shrunk seat on a core cylinder and has a further detachable joint for the functional sleeve, means that the printing plate or rubber-blanket sleeves can be replaced cost-effectively as required.

By means of an advantageous production method for the intermediate sleeves, which provides for the functional surface to be inserted into a cylindrical mould and for the bridging layer to be foam-filled directly, more accurate production tolerances can be achieved, the cost can be reduced, and the omission of the compressed-air holes in this method leads to a further simplification of production.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

In variable-circumference web-fed offset printing machines according to the invention, core cylinders are provided on a machine base instead of the conventional fixed-format plate and blanket cylinders, on which core cylinders various intermediate sleeves with different wall thicknesses can be mounted, so that variable-format surfaces are produced. These intermediate sleeves can bear both printing plates and rubber blankets.

The more extensive equipment of such a machine base with further printing equipment which can be adapted to the various circumferential lengths, such as inking units, damping units or, if appropriate, also in-press image-setting equipment, web guiding systems or folding equipment, will not be discussed further.

Figure 1:
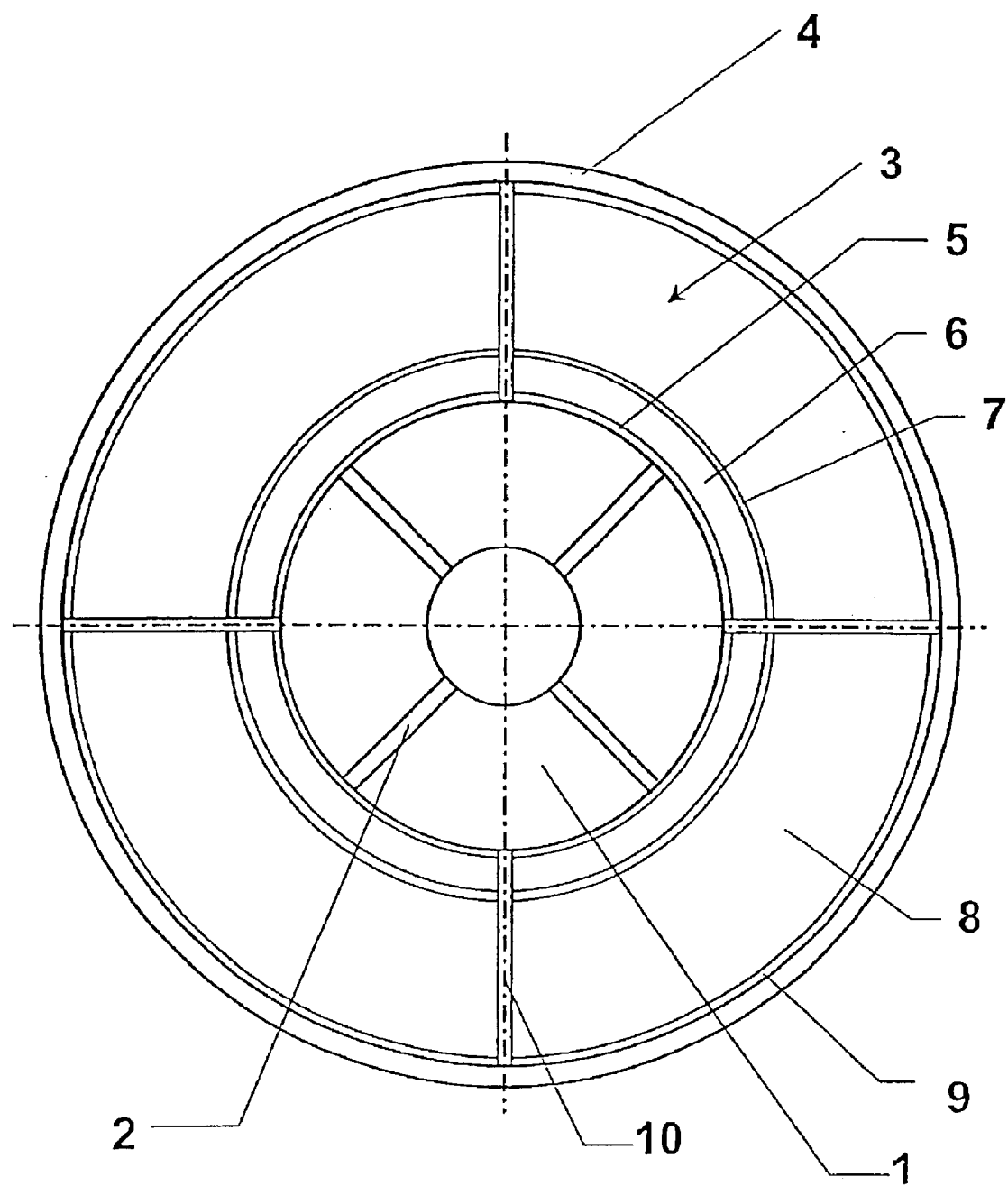
FIG. 1 shows the cross section of an intermediate sleeve with air channels and two detachable joints.

FIG. 1 illustrates a cross section of an intermediate sleeve (3) mounted on a core cylinder (1). The core cylinder (1) is designed as a conventional air cylinder with compressed-air channels (2) distributed over the circumference, which permit the intermediate sleeves (3) to be pushed on axially and shrunk on radially in a reversible manner. The diameter of the core cylinder (1) is defined by the smallest sectional length within the range of formats to be covered and the layer thickness of the functional surface fitted. In order to cover a wide format range, it may be necessary to provide various core cylinders (1) with increasing diameters.

The intermediate sleeve (3) is constructed on a carrier layer (5) which preferably consists of glass-fibre reinforced plastic and, with its cylindrical inner face, forms a detachable joint with the core cylinder (1), its diameter being dimensioned such that a press fit is produced. The carrier layer (5) is a thin layer with a thickness of, for example, about 1 millimeter.

The carrier layer (5) is followed by a compressible intermediate layer (6) of preferably about 3 millimeters layer thickness, which allows the carrier layer (5) a reversible expansion and permits the intermediate sleeve (3) to be shrunk onto the core cylinder (1). The intermediate layer (6) consists of porous polyurethane, for example. Other compressible materials can also be employed.

The intermediate layer (6) is closed off by a thin transition layer (7)—for example about 1 millimeter thick—preferably made of glass-fibre reinforced plastic, onto which a bridging layer (8) with a variable wall thickness is fitted.

The bridging layer (8) is preferably produced from porous rigid polyurethane foam, and its layer thickness is selected in accordance with the sectional length of the format for which the respective intermediate sleeve (3) is provided. Because of the continuously variable thickness of the bridging layer (8), in principle any desired format length can be implemented. The maximum thickness of the bridging layer (8) is about 35 millimeters. If reinforcing structures are used, however, thicker layers are also possible. As a result of the preferred material selection in accordance with a low density, the intermediate sleeves (3) have a low weight and may be handled very easily by hand and permit ergonomic replacement within the printing machine. In addition, because of a low thermal conductivity and low heat capacity, the intermediate sleeves are also suitable for printing processes in which printing plates are thermally loaded in the printing unit, such as in the case of printing-plate production within the printing machine (thermal transfer processes, computer-to-press technologies).

The bridging layer (8) is surrounded by a thin covering layer (9), preferably made of glass-fibre reinforced plastic. The thickness of the covering layer (9) is about 1 millimeter, for example, and its cylindrical circumferential surface is used as a joint with the functional sleeve (4).

For the covering layer (9) and the carrying layer (5) which, at their outer and inner surface, respectively, have detachable joints so that functional sleeves (4) can be shrunk on reversibly or, respectively, so that they can be mounted or dismantled from the core cylinder (1), wear-resistant materials, such as glass-fibre reinforced plastics, must be provided.

Close to one end of the intermediate sleeve (3), on the circumference, compressed-air channels (10) are provided, which lead from the hollow inner side, through all the layers, to the outer surface. They are preferably distributed uniformly around the circumference and oriented radially in relation to the axis of rotation. In order to improve the air pad during the fitting of the functional sleeve (4), further channels running radially (31', FIG. 2) could be provided, being arranged in an axially offset manner approximately centrally between the end faces of the intermediate sleeve (3). As a result of the particularly advantageous arrangement of the compressed-air channels (10) in the radial direction, it is possible to dispense with longitudinal channels—running parallel to the cylinder axis—so that the intermediate sleeves (3) can be produced very simply, and no minimum thickness for the bridging layer (8) has to be taken into account.

The functional sleeve (4) which can be mounted detachably on the covering layer (9) may be a metal or plastic sleeve, which is used as a printing surface or as a carrier for a rubber blanket and, if required, can be replaced simply and cost-effectively.

Figure 2:
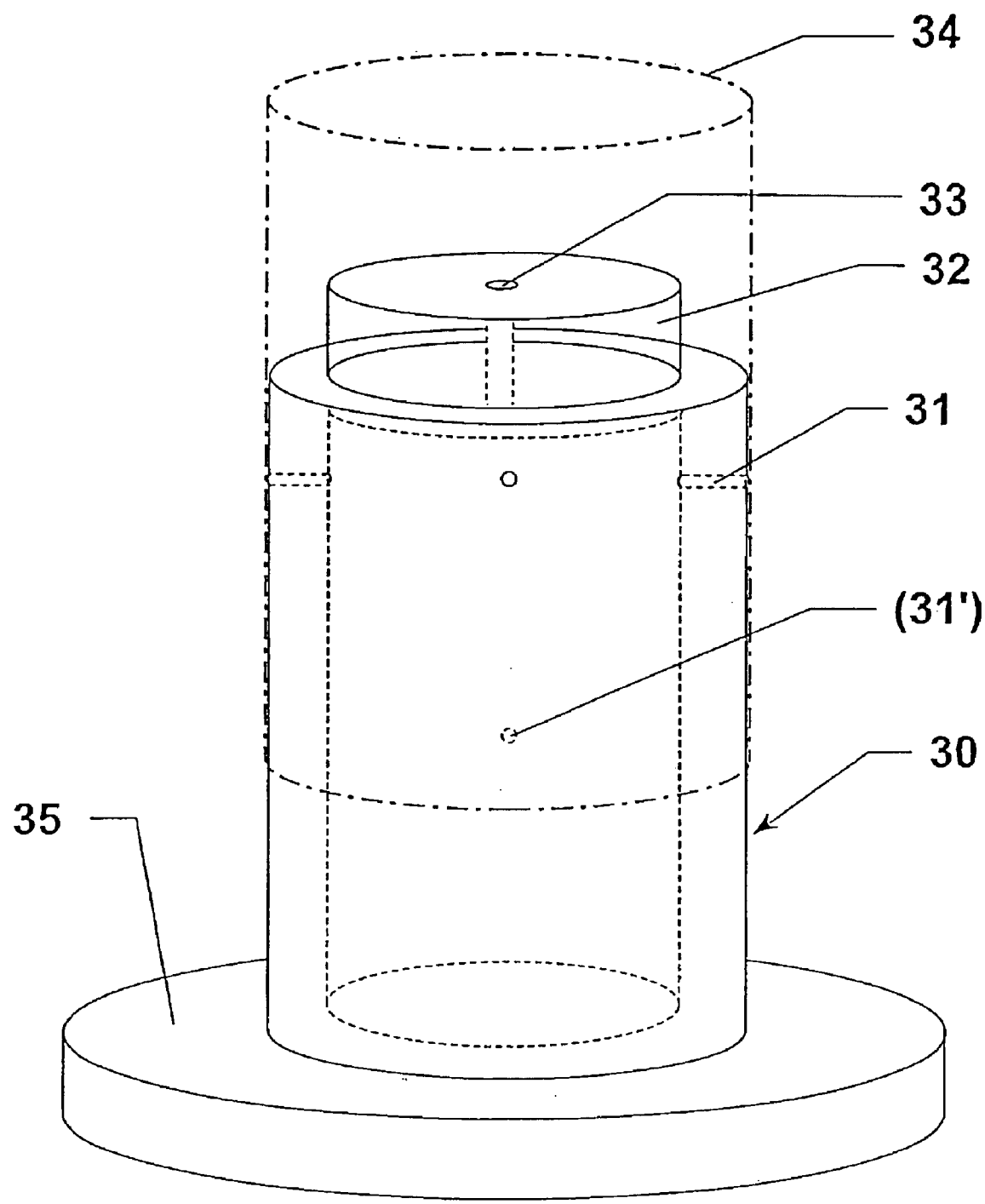
FIG. 2 shows the mounting of a functional sleeve outside the printing machine.

FIG. 2 shows the operation of changing a functional sleeve (34) outside the printing machine. For this purpose, one end face of the intermediate sleeve (30) is closed by being set up on a support (35), and the other end, in the vicinity of which the compressed-air channels (31) running radially are arranged, is sealed off with a cover (32). Via a compressed-air connection (33) on the cover (32), the cavity in the intermediate sleeve (30) is supplied with compressed air, which escapes through the compressed-air channels (31) and possibly through additional—centrally arranged—compressed-air channels (31') on the outer surface of the intermediate sleeve (30). The cover (32) is dimensioned such that the functional sleeve (34) can be put over it onto the intermediate sleeve (30) and can be pushed on the air pad which forms. After the sleeve has been positioned, the compressed air is switched off and the cover (32) is removed. The functional sleeve (34) produces a shrink fit on the intermediate sleeve (30) and closes the compressed-air channels (31, possibly also 31') on the outside. The intermediate sleeve (30) therefore prepared as a plate or rubber-covered cylinder can then be fitted to the corresponding core cylinder (designed as an air cylinder) in the printing machine and, at any time, replaced for a different intermediate sleeve (30) having a different format for the production of a different section length.

As a result of this particularly advantageous method, it is possible to manage with conventional air cylinders on the printing machine, and it is not necessary for any additional air connections or changeover valves to be provided, which reduces the investment costs.

With a known applicator structure, a printing company can tailor the necessary number of intermediate sleeves (30) in advance with appropriate format as plate and rubber-covered cylinders, and change over the machine base in an extremely short time.

Figure 3:
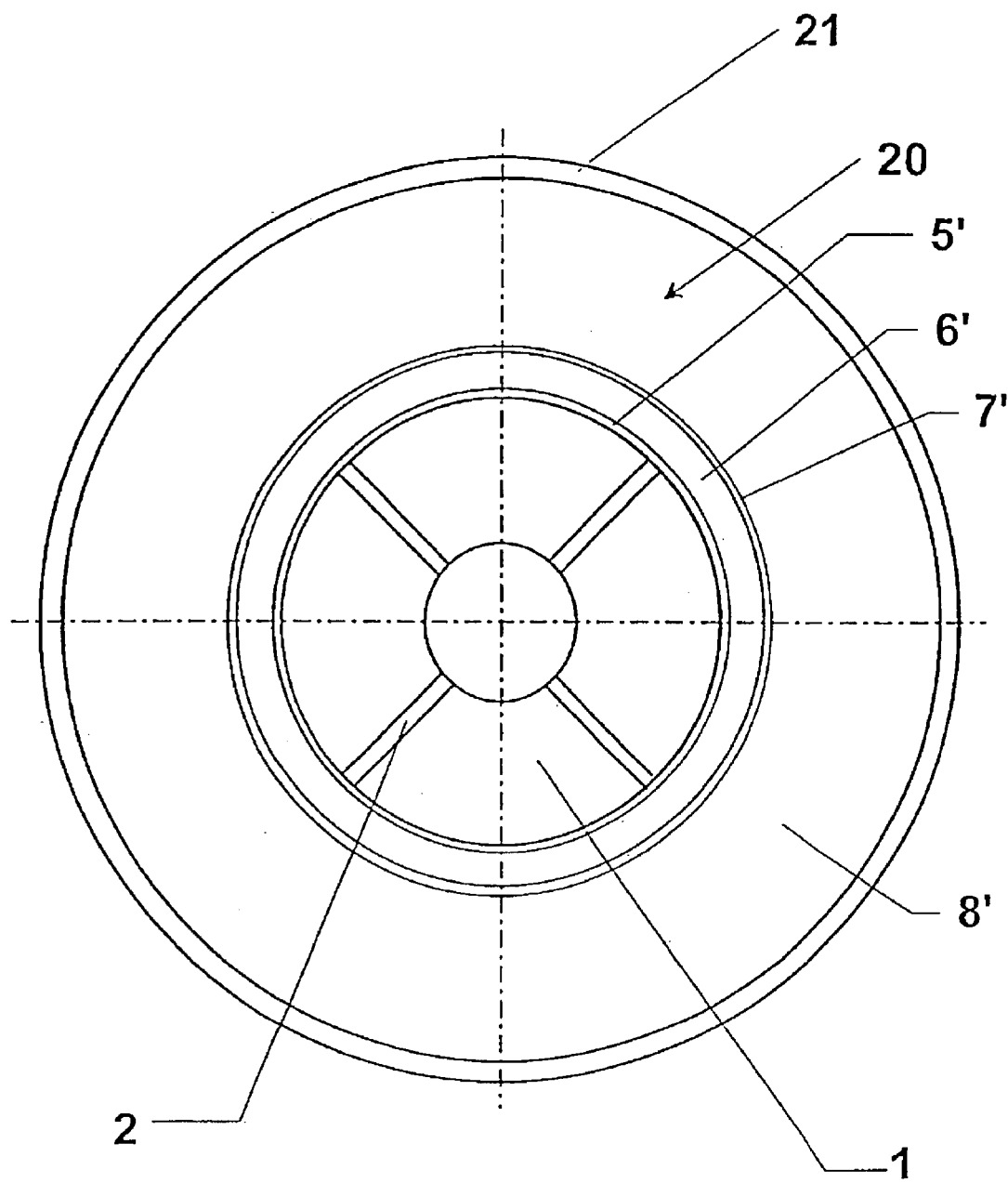
FIG. 3 shows the cross section of an intermediate sleeve with a detachable joint.

FIG. 3 shows a further exemplary embodiment in which the functional layer (21) is non-detachably joined to an intermediate sleeve (20). This intermediate sleeve (20) likewise comprises a carrier layer (5'), intermediate layer (6') and transition layer (7'), which are followed by the variable-thickness bridging layer (8') and the functional layer (21) being joined directly to the bridging layer (8') without any covering layer (9, FIG. 1). Such intermediate sleeves (20) have only a single detachable joint, namely that between the carrier layer (5') and core cylinder (1), and can therefore be designed particularly advantageously without any air channels, which makes their production simpler and more beneficial.

A rubber blanket can, for example, be adhesively bonded onto the bridging layer (8'), sprayed on or vulcanized on. By means of chemical or electroplated metallization of the circumferential surface of the bridging layer (8'), an intermediate sleeve (20) can be tailored as a printing plate.

A further production option provides for a printing plate or a rubber blanket to be inserted into a cylindrical mould and, concentrically with this, a composite of carrier layer (5'), intermediate layer (6') and transition layer (7') to be arranged in its interior. The intermediate space between transition layer (7') and the printing plate or the rubber blanket is then filled with plastic foam. After the plastic has cured, the finished intermediate sleeve (20) tailored as a printing or rubber-covered cylinder can be removed from the apparatus. Dispensing with the second detachable joint means that more accurate production tolerances can be achieved and, because of the integration of the functional surface into the production process of the variable-format intermediate sleeve (20), the costs can be reduced.

In the case of this integrated production process, it is also possible, instead of the functional surface, to fix a conventional clamping channel for conventional printing plates or rubber blankets in the mould and to join them to the intermediate layer (7') by foam filling. For this purpose, the clamping channel can be arranged in a housing, which is fixed in the bridging layer (8') by anchoring parts surrounded by foam.

One advantageous embodiment of the invention illustrated in FIGS. 1–3 is the application to a rubber-covered cylinder of an offset printing machine.

List of Reference Symbols
1 Core cylinder
2 Compressed-air channel
3 Intermediate sleeve
4 Functional sleeve
5,5' Carrier layer
6,6' Intermediate layer
7,7' Transition layer
8,8' Bridging layer
9 Covering layer
10 Compressed-air channel
20 Intermediate sleeve
21 Functional layer
30 Intermediate sleeve
31,31' Compressed-air channel
32 Cover
33 Compressed-air connection
34 Functional sleeve
35 Support Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A variable-format web-fed offset printing machine comprising printing unit cylinders, each said priming unit cylinder comprising a core cylinder having an outer circumferential surface and means for supplying compressed air to said surface, and an intermediate sleeve which can be pushed onto said core cylinder axially and shrunk onto said core cylinder radially, said intermediate sleeve comprising a carrier layer having an inner surface which rests on the surface or the core cylinder, a compressible intermediate layer over said carrier layer, a transition layer over said compressible intermediate layer, a variable-thickness bridging layer over said transition layer, a covering layer on said variable thickness bridging layer, said covering layer having an outer circumferential surface which is suitable for receiving a functional layer, and at least one compressed air channel extending radially from said inner surface of said carrier layer to said outer circumferential surface of said covering layer.

2. A variable format web-fed offset printing machine as in claim 1 wherein said carrier layer consists of glass-fiber reinforced plastic having a thickness of about 1 mm, said compressible intermediate layer consists of porous polyurethane having a thickness of about 3 mm, said transition layer consists of glass-fiber reinforced plastic having a thickness of about 1 mm, said variable thickness bridging layer is up to 35 mm thick, and said covering layer is glass-fiber reinforced plastic having a thickness of about 1 mm.

3. A variable-format web-fed offset printing machine as in claim 2 wherein said functional layer is one of a printing plate and a rubber blanket.

4. A variable format web-fed offset printing machine as in claim 1 wherein said carrier layer, said compressible intermediate layer, said transition layer, and said variable-thickness bridging layer each have a thermal conductivity, a heat capacity, end density which are substantially lower than those of the core cylinder.

5. A variable-format web-fed offset printing machine comprising printing unit cylinders, each said printing unit cylinder comprising a core cylinder having an outer circumferential surface and means for supplying compressed air to said surface, and an intermediate sleeve which can be shrunk onto said core cylinder, said intermediate sleeve comprising a carrier layer having an inner surface winch rests on the surface of the core cylinder, said carrier layer being made of glass fiber reinforced plastic and being separable from said core cylinder, a compressible intermediate layer over said carrier layer, a transition layer over said compressible intermediate layer, said transition layer being made of glass fiber reinforced plastic, a variable thickness bridging layer over said transition layer, said variable thickness bridging layer having an outer circumferential surface, and a functional layer which is inseparably fitted to said outer circumferential surface of said bridging layer by one of adhesive bonding, chemical metallization, and electroplating, whereby no air channel is necessary between said inner surface of said carrier layer and said outer circumferential surface of said bridging layer.

6. A variable formal web-fed offset printing machine as in claim 5 wherein said carrier layer, said compressible intermediate layer, said transition layer, and said variable-thickness bridging layer each have a thermal conductivity, a heat capacity, and density which are substantially lower than those of the core cylinder.

7. A variable-format web-fed offset printing machine as in claim 5 wherein said functional layer is one of a printing plate and a rubber blanket.

* * * * *